US009226001B2

(12) United States Patent
Han

(10) Patent No.: US 9,226,001 B2
(45) Date of Patent: Dec. 29, 2015

(54) APPARATUS FOR PROVIDING SUPPLEMENTARY INFORMATION OF MULTIMEDIA CONTENTS, RECORDED MEDIUM THEREOF, AND PERSONAL STORAGE DEVICE

(71) Applicant: Alticast Corporation, Seoul (KR)

(72) Inventor: Jung Sam Han, Seoul (KR)

(73) Assignee: Alticast Corporation, Seoul (KR)

( * ) Notice: Subject to any disclaimer, the term of this patent is extended or adjusted under 35 U.S.C. 154(b) by 0 days.

(21) Appl. No.: 13/730,328

(22) Filed: Dec. 28, 2012

(65) Prior Publication Data

US 2013/0174207 A1    Jul. 4, 2013

(30) Foreign Application Priority Data

Dec. 29, 2011 (KR) .................. 10-2011-0145972

(51) Int. Cl.
| | |
|---|---|
| H04N 21/436 | (2011.01) |
| H04N 21/23 | (2011.01) |
| H04N 21/4722 | (2011.01) |
| H04N 21/81 | (2011.01) |

(52) U.S. Cl.
CPC ............ *H04N 21/23* (2013.01); *H04N 21/436* (2013.01); *H04N 21/4722* (2013.01); *H04N 21/8133* (2013.01)

(58) Field of Classification Search
CPC .. H04N 21/274; H04N 21/432; H04N 21/433
USPC ............................... 725/93, 32, 40
See application file for complete search history.

(56) References Cited

U.S. PATENT DOCUMENTS

| | | | | |
|---|---|---|---|---|
| 6,415,438 | B1* | 7/2002 | Blackketter et al. | 725/136 |
| 8,347,341 | B2* | 1/2013 | Markley et al. | 725/82 |
| 2004/0015994 | A1* | 1/2004 | Choi et al. | 725/87 |
| 2009/0119723 | A1* | 5/2009 | Tinsman | 725/87 |

(Continued)

FOREIGN PATENT DOCUMENTS

| | | |
|---|---|---|
| EP | 1804244 A2 | 7/2007 |
| GB | 2439593 A | 1/2008 |

(Continued)

*Primary Examiner* — Mark D Featherstone
*Assistant Examiner* — Tien M Nguyen
(74) *Attorney, Agent, or Firm* — Mintz Levin Cohn Ferris Glovsky and Popeo, P.C.; Kongsik Kim; Derek E. Constantine

(57) ABSTRACT

An apparatus and method for providing content supplementary information, a recorded medium related thereto, a personal storage device, and a method of controlling the personal storage device are disclosed. One aspect of the invention provides an apparatus for providing supplementary information of a multimedia content that is connected over a network with a user terminal. The apparatus includes: a receiving unit configured to receive from the user terminal a request for supplementary information of a multimedia content currently in use by a user, where the request for supplementary information comprises at least one of an identifier of the multimedia content, an identifier of supplementary information related to the multimedia content, and address information of a personal storage device matching the user terminal; and a control unit configured to provide control such that the requested supplementary information is read from a database and transmitted to the personal storage device.

12 Claims, 5 Drawing Sheets

(56) References Cited

U.S. PATENT DOCUMENTS

2011/0177775 A1* 7/2011 Gupta et al. ............... 455/3.06
2012/0158547 A1* 6/2012 Wood et al. ............... 705/27.1
2012/0159540 A1* 6/2012 Park et al. ................. 725/34

FOREIGN PATENT DOCUMENTS

| | | |
|---|---|---|
| WO | 98/53611 A1 | 11/1998 |
| WO | 02-39745 A1 | 5/2002 |
| WO | 2008-055180 A2 | 5/2008 |

* cited by examiner

APPARATUS FOR PROVIDING SUPPLEMENTARY INFORMATION OF MULTIMEDIA CONTENTS, RECORDED MEDIUM THEREOF, AND PERSONAL STORAGE DEVICE

CROSS-REFERENCE TO RELATED APPLICATIONS

This application claims the benefit of Korean Patent Application No. 10-2011-0145972, filed with the Korean Intellectual Property Office on Dec. 29, 2011, the disclosure of which is incorporated herein by reference in its entirety.

BACKGROUND

1. Technical Field

The embodiments of the invention relate to an apparatus for providing supplementary information of multimedia contents, a recorded medium for providing supplementary information, and a personal storage device; more particularly, the embodiments of the invention relate to an apparatus for providing supplementary information, a recorded medium for providing supplementary information, and a personal storage device, with which the supplementary information of multimedia contents can be accessed without being constrained by time or location.

2. Description of the Related Art

Recent times have seen rapid advances in digital broadcasting, as a result of which broadcasting stations can now not only transmit A/V (audio/video) broadcast signals, but can also transmit various data broadcast signals in either a combined or an independent form.

Such data broadcasts can be classified into synchronized data broadcasts and independent data broadcasts, depending on whether or not the data broadcast signals and the A/V broadcast signals are synchronized, and can provide the user with various information through an application transmitted together.

In a synchronized type data broadcast service, the data broadcast information must inherently coincide with the schedule of the A/V currently being broadcasted. That is, the synchronized data broadcast for a drama program should begin at the same time the drama program begins and end when the drama program ends. Also, the application of the data broadcast should be executed based on the schedule information for the broadcast program.

Thus, in a conventional synchronized type data broadcast service, the user may no longer be able to obtain information on programs once the broadcast is finished, and the user may have to personally search SNS (social networking service) posts or forums of the broadcasting station, etc., in order to obtain such information.

As a solution to this problem, Korean Patent Publication No. 2001-0096552 (title of invention: Apparatus and Method for Providing and Obtaining Product Information through Broadcast Signals) discloses a method and apparatus for providing and obtaining product information in which product information is provided together with the picture signals, and a terminal such as a computer or a television set receiving the information compares the continuously received product information with the product information received previously, adds to the previously stored product information if the product information is determined to be new, and provides the stored product information upon request by the user.

The prior art invention identified above, however, is to provide product information and hence merely presents the user with a guide for purchasing. The above invention is limited in that it does not address the issue of providing the user with various data broadcast information through an application provided together.

Also, in the prior art invention identified above, the criterion for storing product information involves simply determining whether or not the information matches the previously stored product information and storing all information if it was not stored already, thus leaving room for improvements in terms of efficient use of data resources.

SUMMARY

An aspect of the invention is to provide an apparatus, a recorded medium, and a personal storage device, for providing a user with various supplementary information related to a multimedia content without being constrained by time or location.

One aspect of the invention provides an apparatus for providing supplementary information of a multimedia content that is connected over a network with a user terminal. The apparatus includes: a receiving unit configured to receive from the user terminal a request for supplementary information of a multimedia content currently in use by a user, where the request for supplementary information comprises at least one of an identifier of the multimedia content, an identifier of supplementary information related to the multimedia content, and address information of a personal storage device matching the user terminal; and a control unit configured to provide control such that the requested supplementary information is read from a database and transmitted to the personal storage device.

The user terminal can receive at least one of the multimedia content, the identifier of the multimedia content, and the identifier of the supplementary information, from a content server.

The supplementary information can include at least one of information regarding an object displayed to a viewer through the multimedia content and information regarding an application program for providing control such that the information regarding the object is displayed to the user.

The personal storage device can be a personal storage device based on a cloud service.

The user terminal can transmit the request for supplementary information if a viewing time of the multimedia content currently in use by the user exceeds a particular amount of time.

The request for supplementary information can further include information on a replay segment of the multimedia content currently in use by the user, and the control unit can provide control such that supplementary information included in the replay segment of the multimedia content is read from a database and transmitted to the personal storage device.

Another aspect of the invention provides a personal storage device connected over a network with a user terminal and a content supplementary information server. The personal storage device includes: a receiving unit configured to receive supplementary information from the content supplementary information server in accordance with a request from the user terminal, where the supplementary information is related to a multimedia content currently in use by a user of the user terminal; a storage unit configured to store the received supplementary information; and a transmitting unit configured to transmit supplementary information corresponding to multimedia content identification information when the multimedia content identification information is received from the user terminal.

The supplementary information can include at least one of information regarding an object displayed to a viewer through the multimedia content and information regarding an application program for providing control such that the information regarding the object is displayed to the user.

The personal storage device can further include a determining unit configured to determine whether or not the information regarding the application program received by the receiving unit is previously stored in the storage unit. If the determining unit determines that the information regarding the application program is previously stored information, then the storage unit can store the information regarding the object displayed and connection information regarding the previously stored application program.

The user terminal can transmit the request for supplementary information if a viewing time of the multimedia content currently in use by the user exceeds a particular amount of time.

Yet another aspect of the invention provides a recorded medium readable by a digital processing device, tangibly embodying a program of instructions executable by the digital processing device to perform a method for providing supplementary information for a content that includes: receiving from the user terminal a request for supplementary information of a multimedia content currently in use by a user, where the request for supplementary information includes at least one of an identifier of the multimedia content, an identifier of supplementary information related to the multimedia content, and address information of a personal storage device matching the user terminal; and providing control such that the requested supplementary information is read from a database and transmitted to the personal storage device.

Certain embodiments of the invention provide the advantage of increased convenience for the user, as the user of a terminal can access various information regarding a multimedia content unconstrained by time or location, even after the use of the multimedia content has been concluded.

Also, certain embodiments of the invention make it possible to store various information regarding a multimedia content without interrupting the user's viewing of the multimedia content, and to efficiently utilize data resources.

Additional aspects and advantages of the present invention will be set forth in part in the description which follows, and in part will be obvious from the description, or may be learned by practice of the invention.

DETAILED DESCRIPTION

Figure 1:
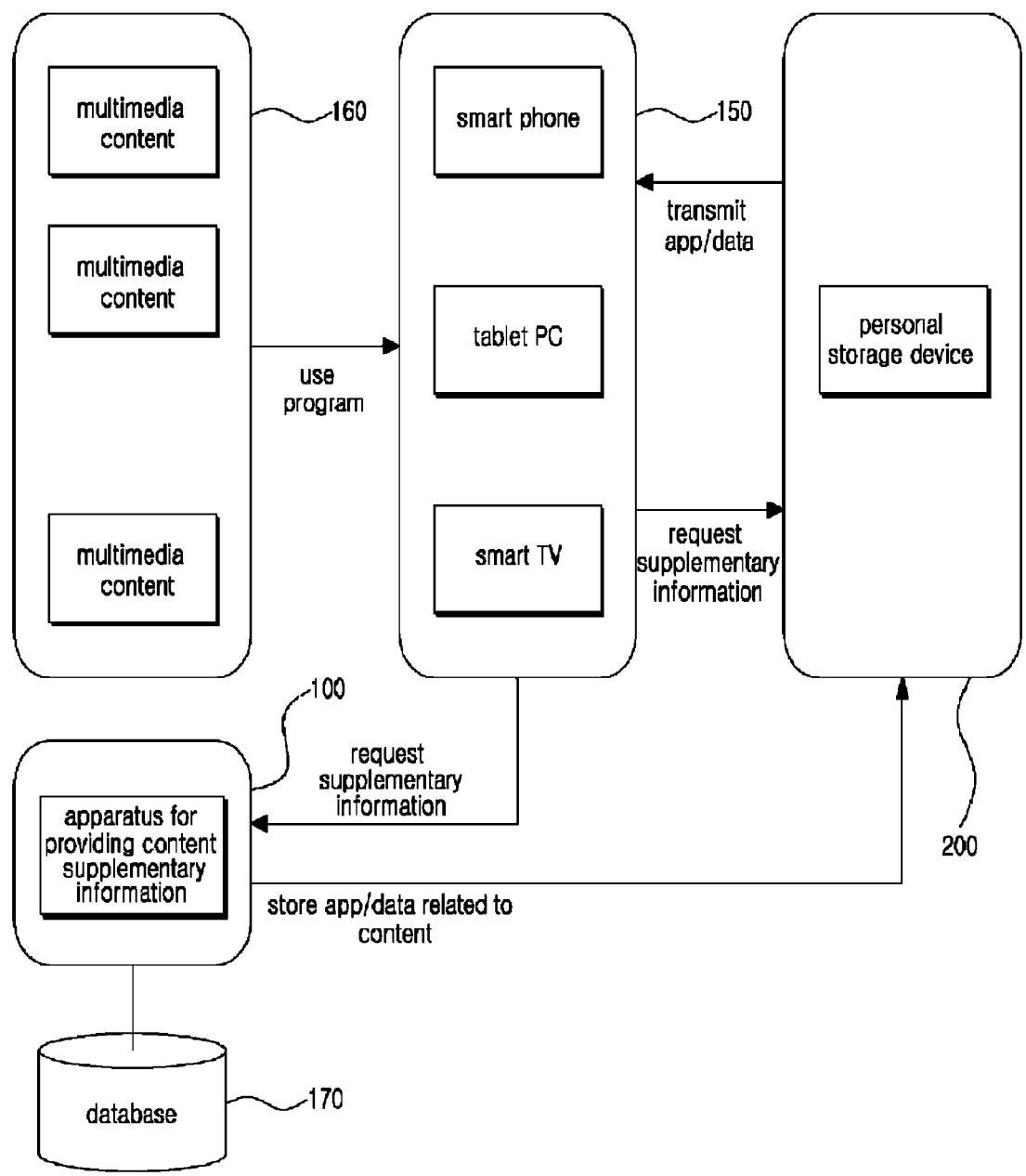
FIG. 1 is a block diagram illustrating the operation of an apparatus for providing content supplementary information according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the present invention will be described below in more detail with reference to accompanying drawings.

FIG. 1 is a block diagram illustrating the composition of a system for providing content supplementary information according to an embodiment of the invention.

As illustrated in FIG. 1, a system for providing content supplementary information can include an apparatus 100 for providing content supplementary information, and a user terminal 150 and a personal storage device 200 connected over a network with the apparatus 100 for providing content supplementary information.

Also, the user terminal 150 can be connected over a network with a content server 160.

The apparatus 100 for providing content supplementary information may be connected by the network with the user terminal 150 and personal storage device 200, and when a user uses a multimedia content on the user terminal 150, the apparatus 100 may store supplementary information for the content in use in the personal storage device 200, so that the user may access the supplementary information even after the use of the content is finished.

The user terminal 150 refers to a device such as a smart phone, tablet PC, smart TV, etc., that is capable not only of receiving and replaying contents but also requesting and receiving supplementary information for contents over a network.

A request for supplementary information can be received from one or more user terminal 150 carried by the user, and the supplementary information of multimedia contents used in each user terminal 150 can be stored in a single personal storage device 200.

The personal storage device 200 may be a device capable of storing supplementary information regarding a content used on one or more user terminal 150 carried by the user, and of providing the supplementary information to any user terminal 150 upon the user's request. The personal storage device 200 may be, for example, a cloud server. A more detailed description on this will be provided later with reference to FIG. 3.

The multimedia contents can include various contents such as movies, documentaries, arts, sports, drama, advertisements, etc., provided to the user through airwave broadcasts, groundwave broadcasts, satellite broadcasts, cable broadcasts, IPTV, the Internet, etc., and can include both live programming and VOD programming.

The supplementary information may be information regarding an object displayed to the viewer through such multimedia content, and can include, for example, information relating to a restaurant, culinary information, a regional specialty, a location, etc. (hereinafter referred to as 'information regarding an object' for convenience).

That is, the apparatus 100 for providing content supplementary information may store various information regarding objects displayed to the viewer in the personal storage device 200, allowing the user of the user terminal 150 to access the information as necessary after the user is finished using the content.

Also, the supplementary information can further include information regarding an application program for providing control such that the information regarding the object is displayed to the user (hereinafter referred to as 'information regarding an application program' for convenience).

That is, the supplementary information can further include an application for displaying the information regarding the object to the viewer; for example, it can include an application that uses the location information for a sightseeing region to mark the region on a map and display it to the viewer.

Similar to the synchronized type data broadcast service, there would be no application program provided from the broadcasting station once the multimedia content is finished. Thus, the apparatus 100 for providing content supplementary information according to an embodiment of the invention may store the information regarding the application program together with the information regarding the object, so as to allow the user to access the supplementary information even after the use of the multimedia content is finished.

The user terminal 150 can receive a multimedia content such as the above from a content server 160 and can further receive an identifier of the supplementary information from the content server 160 as tag information for requesting the supplementary information from the apparatus 100 for providing content supplementary information.

That is, the supplementary information for a multimedia content may be stored in the apparatus 100 for providing content supplementary information according to an embodiment of the invention, and the user terminal 150 may receive only the identifier of the supplementary information for the multimedia content, to request the supplementary information from the apparatus 100 for providing content supplementary information.

The composition of the apparatus 100 for providing content supplementary information and the personal storage device 200 according to an embodiment of the invention will be described below in more detail with reference to FIG. 2 and FIG. 3.

Figure 2:
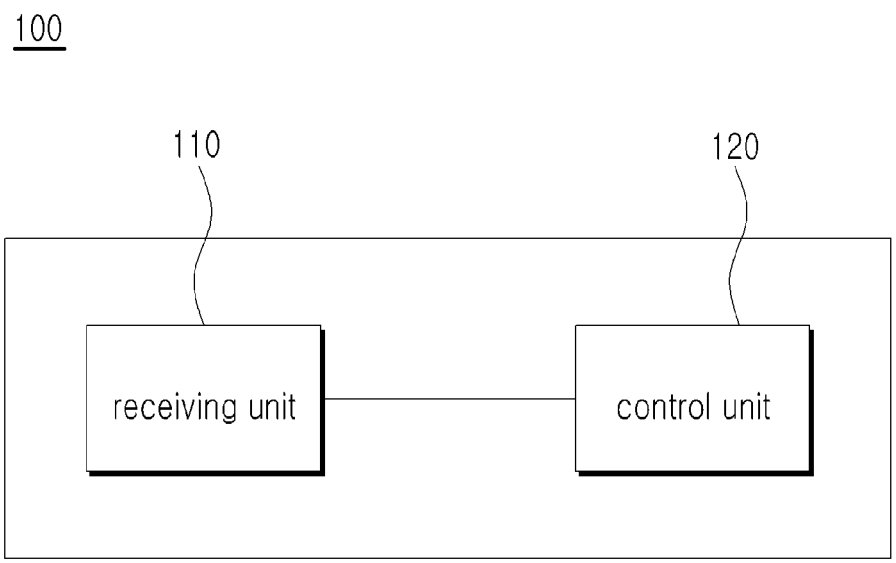
FIG. 2 illustrates the detailed composition of an apparatus for providing content supplementary information according to an embodiment of the invention.

FIG. 2 illustrates the detailed composition of an apparatus 100 for providing content supplementary information according to an embodiment of the invention.

As illustrated in FIG. 2, the apparatus 100 for providing content supplementary information may include a receiving unit 110 and a control unit 120.

First, the receiving unit 110 according to an embodiment of the invention may receive from the user terminal 150 a request for supplementary information of a multimedia content currently in use by the user.

Here, the request for supplementary information may include at least one of an identifier of the multimedia content, an identifier of the supplementary information related to the multimedia content, address information of a personal storage device 200 matching the user terminal 150, and an identifier of the user terminal.

According to an embodiment of the invention, the address information of the personal storage device 200 can be stored in the apparatus 100 for providing content supplementary information in a matching relationship with the user terminal identifier. In this case, the request for supplementary information of a user terminal 150 can include the user terminal identifier instead of the address information of the personal storage device 200.

The receiving unit 110 of the apparatus 100 for providing content supplementary information may receive from a user terminal 150 a request that supplementary information is needed for the multimedia content currently in use by the user. As is described below in more detail, the control unit 120 may store the supplementary information corresponding to the identifier of the supplementary information in the personal storage device 200 corresponding to the address information of the personal storage device 200.

According to an embodiment of the invention, the request for supplementary information can further include information on the replay segment of the multimedia content currently in use by the user.

That is, the receiving unit 110 can receive replay segment information of the content, as well as the identifier of the supplementary information and address information of the personal storage device 200, from the user terminal 150, so that only the supplementary information included in the replay segment may be stored in the personal storage device 200.

Here, the replay segment can be generally expressed as a replay time.

If the request for supplementary information includes replay segment information of the multimedia content, it is possible to include only the identifier of the multimedia content, from among the identifiers listed above, in the request for supplementary information.

Transmitting the request for supplementary information from a user terminal 150 can be achieved when the user of the user terminal 150 decides that supplementary information is needed while viewing a content, and manipulates a remote control capable of performing the related functions.

For example, if the user of a user terminal 150 watching a sports broadcast wishes to obtain information on an athlete's physique, the user may press a corresponding button on the remote control, at which the user terminal 150 may transmit the supplementary information identifier of the sports broadcast the user is viewing and the address information of the user's personal storage device 200 to the receiving unit 110.

Here, the user terminal 150 can further transmit the replay segment information of the sports broadcast being viewed by the user, and can have only the information related to the physique of the athlete corresponding to the replay segment stored in the personal storage device 200.

By thus storing in the personal storage device 200 only the supplementary information included in the required replay segment, the storage space can be utilized with greater efficiency.

According to an embodiment of the invention, the transmitting of the request for supplementary information from a user terminal 150 can also be performed based on the usage time of the content.

That is, if the user of a user terminal 150 views a certain content for a particular amount of time or longer, the supplementary information of the content can be stored in the personal storage device 200, even when there is no manipulation made by the user, to provide the user with greater convenience.

In other words, the user terminal 150 may transmit to the apparatus 100 for providing content supplementary information a request for supplementary information, for a content which is viewed by the user for a preset amount of time or longer, and the apparatus 100 for providing content supplementary information may store the requested content supplementary information in the personal storage device 200.

The supplementary information can be stored for contents that are viewed for 5 seconds or longer, for example, to exclude short viewing times such as when the user is continuously flipping channels to search for a desired channel.

The viewing time for a multimedia content can be counted starting from a point when the user maintains the selected channel, and when the viewer continues to view the next multimedia content on the same channel, the counting can begin from the point at which the key of the new multimedia content is assigned.

Next, the control unit 120 according to an embodiment of the invention may provide control such that the requested supplementary information is read from a database 170 and transmitted to the personal storage device 200.

The database 170 may include supplementary information for various multimedia contents provided from the content server 160 to the user terminal 150, and may be accessed by the control unit 120.

As described above, the supplementary information corresponding to a supplementary information identifier can be controlled to be stored in the personal storage device 200 corresponding to the address information of the personal storage device 200.

Also, according to an embodiment of the invention, the control unit 120 can provide the control such that only the supplementary information included in a certain replay segment of the content is read from the database 170 and stored in the personal storage device 200.

Figure 3:
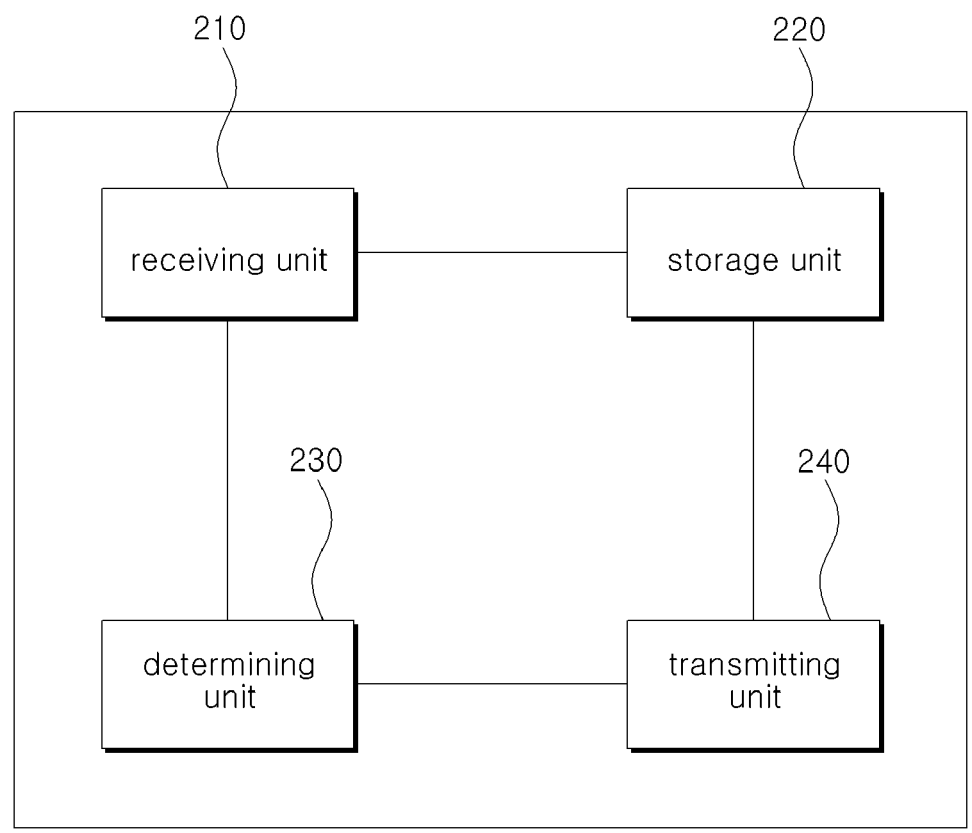
FIG. 3 illustrates the detailed composition of a personal storage device according to an embodiment of the invention.

FIG. 3 illustrates the detailed composition of a personal storage device 200 according to an embodiment of the invention.

As illustrated in FIG. 3, the personal storage device 200 can include a receiving unit 210, a storage unit 220, a determining unit 230, and a transmitting unit 240. Each component is described below in more detail.

The receiving unit 210 may receive supplementary information from the apparatus 100 for providing content supplementary information in accordance to a request of the user terminal 150, and the storage unit 220 may store the supplementary information received.

That is, the receiving unit 210 may receive only the supplementary information for which there is a request from a user terminal 150 and store the information in the storage unit 220, so as to utilize data resources more efficiently.

The supplementary information may be information related to a multimedia content currently in use by the user of the user terminal 150, and as described above, can include at least one of information regarding an object displayed to the user and information regarding an application program.

The supplementary information stored in the storage unit 220 can be stored in an indexed format, to be conveniently selected later upon the user's request. For instance, the supplementary information of contents can be stored in the storage unit 220 indexed according to the multimedia content, genre, or date.

Here, a personal storage device 200 according to an embodiment of the invention can transmit the index information to the user terminal 150, in order that the index information stored in the storage unit 220 may be presented to the user of the user terminal 150, and the user can select the required supplementary information from the index information thus provided.

The supplementary information for contents may be continuously updated and stored in the storage unit 220 as the user uses multimedia contents on the user terminal 150. Among the updated information, any redundant information, especially concerning application programs, can be excluded from the updates if they are the same.

That is, the determining unit 230 according to an embodiment of the invention can determine whether or not new supplementary information for a multimedia content is the same as information regarding an application program previously stored in the storage unit 220, and if they are the same, can store only the connection information for the previously stored application program in the storage unit 220, in order to minimize the amount of stored information. This allows for more efficient storing of multimedia content information.

Continuing with the description, when multimedia content identification information is received from the user terminal 150, the transmitting unit 240 may transmit to the user terminal 150 the supplementary information corresponding to the received multimedia content identification information.

For the user's convenience, index information relating to the stored supplementary information can additionally be transmitted to the user terminal 150.

Thus, the apparatus 100 for providing content supplementary information according to an embodiment of the invention may store the supplementary information for a multimedia content used on the user terminal 150 in a personal storage device 200 that is separate from the user terminal 150, and therefore does not restrict the use of the content by the user.

Also, the invention allows for greater convenience for the user, since the supplementary information for a multimedia content used on any one user terminal 150 carried by the user can be accessed by another user terminal 150 carried by the user.

As only the supplementary information requested from a user terminal 150 is stored in the personal storage device 200, the data resources can be utilized more efficiently.

Figure 4:
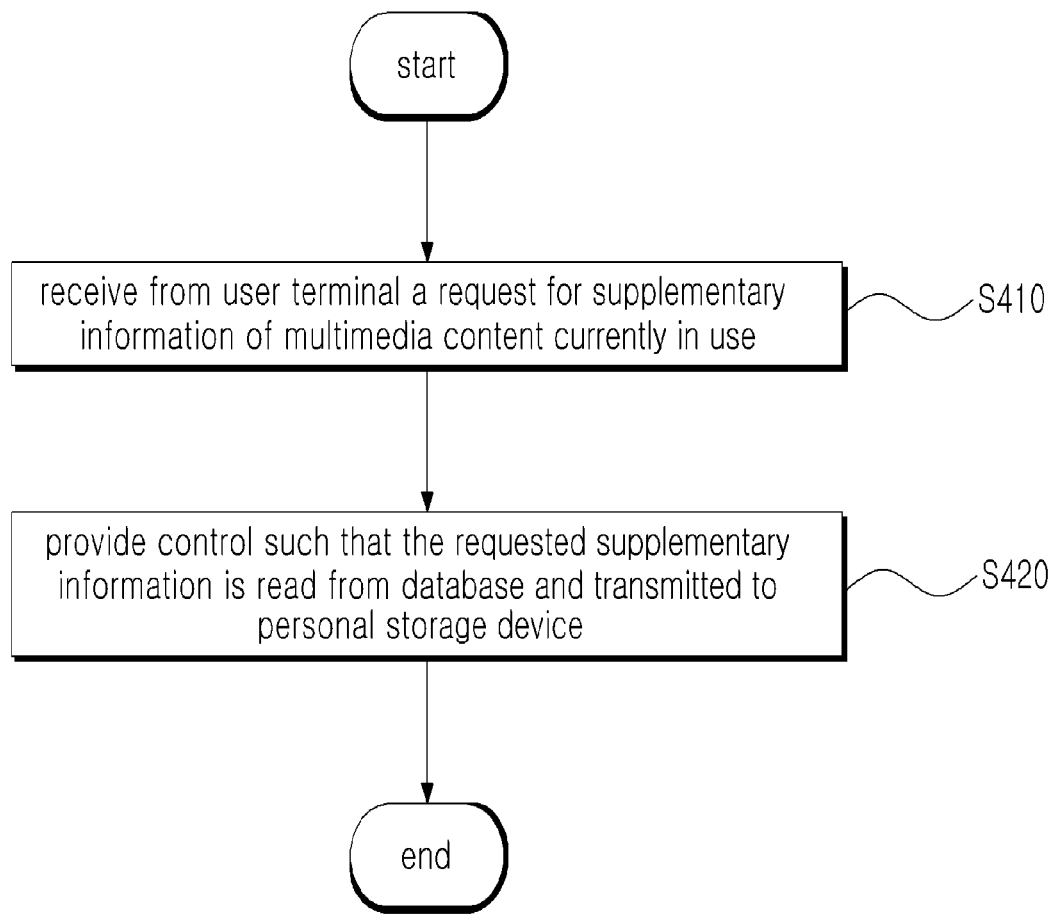
FIG. 4 is a flowchart illustrating in detail the chronological flow of a method of providing content supplementary information according to an embodiment of the invention.

FIG. 4 is a flowchart illustrating in detail the chronological flow of a method of providing content supplementary information according to an embodiment of the invention, where FIG. 4 illustrates the processing at an apparatus for providing content supplementary information.

As illustrated in FIG. 4, the method of providing content supplementary information may include receiving a request for supplementary information (S410) and providing control for transmitting the supplementary information (S420).

First, in operation S410, a request for supplementary information of the multimedia content currently in use by the user may be received from the user terminal 150.

As described above, the request for supplementary information may include at least one of an identifier of the supplementary information related to the multimedia content and the address information of the personal storage device 200 matching the user terminal 150.

Then, in operation S420, control may be provided such that the requested supplementary information is read from a database 170 and transmitted to the personal storage device 200.

Figure 5:
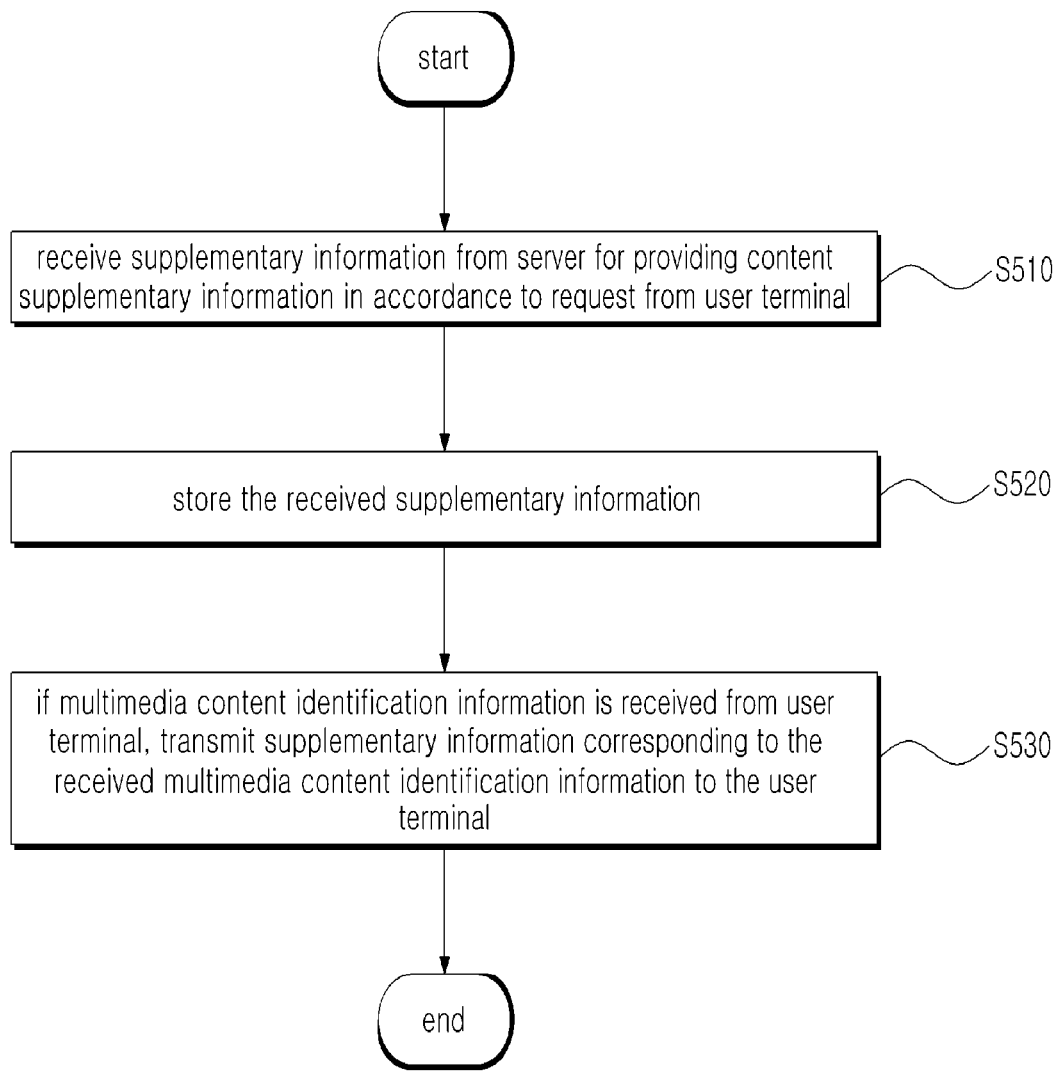
FIG. 5 is a flowchart illustrating in detail the chronological flow of a method of controlling a personal storage device according to an embodiment of the invention.

FIG. 5 is a flowchart illustrating in detail the chronological flow of a method of controlling a personal storage device according to an embodiment of the invention, where FIG. 5 illustrates the processing at the personal storage device.

As illustrated in FIG. 5, the method of controlling the personal storage device may include receiving (S510), storing (S520), and transmitting supplementary information.

First, in operation S510, the supplementary information may be received from the apparatus 100 for providing content supplementary information in accordance with a request from the user terminal 150.

Then, in operation S520, the received supplementary information may be stored. According to an embodiment of the invention, if the received information regarding an application program is the same as previously stored information regarding an application program, then only the connection information for the previously stored application program can be stored.

Lastly, in operation S530, when multimedia content identification information is received from the user terminal 150, the supplementary information corresponding to the received multimedia content identification information may be transmitted to the user terminal 150.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus for providing supplementary information of a multimedia content, the apparatus connected over a network with a user terminal and a personal storage device, which are independent of one another, the apparatus comprising:
a receiver that receives from the user terminal a first request for supplementary information of a multimedia content currently in use by a user of the user terminal, the first request comprising at least one of an identifier of the multimedia content, an identifier of supplementary information related to the multimedia content, and address information of the personal storage device matching the user terminal; and
a controller that provides control such that the requested supplementary information is read from a database and transmitted to the personal storage device, wherein
the user terminal transmits the first request when a viewing time of the multimedia content currently in use by the user exceeds a particular amount of time, and
the user terminal transmits a second request for supplementary information related to the multimedia content to the personal storage device after the user has finished viewing the multimedia content for which supplementary information is desired, the second request indicating multimedia content identification information related to the multimedia content for which supplementary information is desired, and
the user terminal receives the requested supplementary information from the personal storage device.

2. The apparatus for providing supplementary information according to claim 1, wherein the user terminal receives at least one of the multimedia content, the identifier of the multimedia content, and the identifier of the supplementary information, from a content server.

3. The apparatus for providing supplementary information according to claim 1, wherein the supplementary information comprises at least one of information regarding an object displayed to a viewer through the multimedia content and information regarding an application program for providing control such that the information regarding the object is displayed to the user.

4. The apparatus for providing supplementary information according to claim 1, wherein the personal storage device is a personal storage device based on a cloud service.

5. The apparatus for providing supplementary information according to claim 1, wherein
the user terminal transmits the first request when a request of the user exists while the multimedia content is being replayed,
the first request for supplementary information further comprises information on a replay segment of the multimedia content according to the request of the user, and
the controller provides control such that supplementary information included in the replay segment of the multimedia content is read from a database and transmitted to the personal storage device.

6. The apparatus for providing supplementary information according to claim 1, wherein one or more user terminals carried by the user receive the requested supplementary information from the personal storage device if the one or more user terminals transmit the second request.

7. A personal storage device connected over a network with a user terminal and a content supplementary information server, the personal storage device comprising:
a receiver that receives:
supplementary information from the content supplementary information server in accordance with a first request transmitted from the user terminal to the content supplementary information server, the supplementary information being related to a multimedia content currently in use by a user of the user terminal, and
a second request indicating multimedia content identification information from the user terminal, the multimedia content identification information being related to a multimedia content for which supplementary information is desired;
a storage unit that stores the received supplementary information; and
a transmitter that determines supplementary information which corresponds to the received multimedia content identification information when the second request is received, retrieve the determined supplementary information from the storage unit, and transmit the determined supplementary information to the user terminal, wherein
the user terminal transmits the first request when a viewing time of the multimedia content currently in use by the user exceeds a particular amount of time, and
the user terminal transmits the second request after the user has finished viewing the multimedia content for which supplementary information is desired.

8. The personal storage device of claim 7, wherein the supplementary information comprises at least one of information regarding an object displayed to a viewer through the multimedia content and information regarding an application program for providing control such that the information regarding the object is displayed to the user.

9. The personal storage device of claim 8, further comprising:
a determiner that determines whether or not the information regarding the application program received by the receiver is previously stored in the storage unit,
wherein if the determiner determines that the information regarding the application program is previously stored information, then the storage unit stores the information regarding the object displayed and connection information regarding the previously stored application program.

10. The personal storage device of claim 7, wherein one or more user terminals carried by the user receive the requested supplementary information from the personal storage device if the one or more user terminals transmit the second request.

11. A non-transitory recorded medium readable by a digital processing device, tangibly embodying a program of instructions executable by the digital processing device to perform a method for providing supplementary information for a content, the digital processing device connected over a network with a user terminal and a personal storage device, which are independent of one another, the method comprising:
receiving from the user terminal a first request for supplementary information of a multimedia content currently in use by a user of the user terminal, the first request comprising at least one of an identifier of the multimedia content, an identifier of supplementary information related to the multimedia content, and address information of the personal storage device matching the user terminal; and
providing control such that the requested supplementary information is read from a database and transmitted to the personal storage device, wherein
the user terminal transmits the first request when a viewing time of the multimedia content currently in use by the user exceeds a particular amount of time, and
the user terminal transmits a second request for supplementary information related to the multimedia content to the personal storage device after the user has finished viewing the multimedia content for which supplementary information is desired, the second request indicating multimedia content identification information related to the multimedia content for which supplementary information is desired, and
the user terminal receives the requested supplementary information from the personal storage device.

12. The non-transitory recorded medium readable of claim 11, wherein one or more user terminals carried by the user receive the requested supplementary information from the personal storage device if the one or more user terminals transmit the second request.

* * * * *